United States Patent
Gao et al.

(10) Patent No.: US 8,766,564 B2
(45) Date of Patent: Jul. 1, 2014

(54) METHOD OF REDUCING THE EFFECT OF PREHEAT TIME VARIATION DURING SHAPE MEMORY ALLOY ACTUATION

(75) Inventors: Xiujie Gao, Troy, MI (US); Lei Hao, Troy, MI (US); Paul W. Alexander, Ypsilanti, MI (US); Guillermo A. Herrera, Winnetka, CA (US); Nancy L. Johnson, Northville, MI (US); Geoffrey P. McKnight, Los Angeles, CA (US); Alan L. Browne, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 13/251,415

(22) Filed: Oct. 3, 2011

(65) Prior Publication Data

US 2013/0081493 A1    Apr. 4, 2013

(51) Int. Cl.
    *H02N 10/00*    (2006.01)
    *H02P 3/00*     (2006.01)

(52) U.S. Cl.
    USPC ........... 318/117; 318/119; 318/135; 126/581; 126/607

(58) Field of Classification Search
    USPC ............... 318/117, 119, 609, 610, 623, 135; 126/581, 607
    See application file for complete search history.

(56) References Cited

U.S. PATENT DOCUMENTS

| | | | |
|---|---|---|---|
| 5,331,861 A * | 7/1994 | Joffe | 74/89.36 |
| 5,524,499 A * | 6/1996 | Joffe | 74/89.36 |
| 5,607,033 A * | 3/1997 | Naedler et al. | 188/71.8 |
| 5,623,176 A * | 4/1997 | Brandt, Jr. | 310/80 |
| 5,650,704 A * | 7/1997 | Pratt et al. | 318/623 |
| 5,910,720 A * | 6/1999 | Williamson et al. | 318/623 |
| 6,002,184 A * | 12/1999 | Delson et al. | 310/14 |
| 6,147,422 A * | 11/2000 | Delson et al. | 310/14 |
| 6,307,285 B1 * | 10/2001 | Delson et al. | 310/14 |
| 6,374,648 B1 * | 4/2002 | Mitsuyama | 70/57.1 |
| 7,614,228 B2 * | 11/2009 | Hamaguchi et al. | 60/527 |
| 7,692,091 B2 * | 4/2010 | Altaii et al. | 136/246 |
| 7,764,159 B2 * | 7/2010 | Zanella et al. | 337/140 |
| 7,891,265 B2 * | 2/2011 | Erikson et al. | 74/441 |
| 7,961,412 B2 * | 6/2011 | Iwasaki et al. | 359/820 |
| 8,068,167 B2 * | 11/2011 | Honda et al. | 348/357 |
| 8,307,818 B2 * | 11/2012 | Karim et al. | 126/607 |
| 8,316,840 B2 * | 11/2012 | Karim et al. | 126/581 |
| 8,499,913 B2 * | 8/2013 | Gunter | 192/12 B |
| 2003/0046872 A1 * | 3/2003 | Fukumura et al. | 49/360 |
| 2003/0101834 A1 * | 6/2003 | Huang | 74/89.42 |
| 2004/0261688 A1 | 12/2004 | MacGregor et al. | |
| 2005/0250614 A1 * | 11/2005 | Lumpkin et al. | 475/266 |
| 2006/0148296 A1 * | 7/2006 | Zanella et al. | 439/310 |

(Continued)

FOREIGN PATENT DOCUMENTS

EP    1607628 B1    3/2007

OTHER PUBLICATIONS

International Search Report and the Written Opinion for S.N. PCT/US2012/000476 dated Mar. 25, 2013 (11 pages).

*Primary Examiner* — Paul Ip

(57) ABSTRACT

A system for and method of reducing the effects of preheat period variation in shape memory alloy actuation, include sensing the removal of motion delay due to slack, backlash, and/or compliance in the actuator and drive-train of the system, and determining actuator activation, as a result thereof.

20 Claims, 2 Drawing Sheets

(56) References Cited

U.S. PATENT DOCUMENTS

| | | | |
|---|---|---|---|
| 2007/0074753 A1* | 4/2007 | Altali et al. | 136/243 |
| 2007/0137196 A1* | 6/2007 | Hamaguchi et al. | 60/527 |
| 2007/0243810 A1 | 10/2007 | Browne et al. | |
| 2008/0115605 A1* | 5/2008 | Erikson et al. | 74/89.42 |
| 2009/0009656 A1* | 1/2009 | Honda et al. | 348/372 |
| 2009/0303619 A1* | 12/2009 | Iwasaki et al. | 359/811 |
| 2009/0315489 A1* | 12/2009 | Karim et al. | 318/117 |
| 2011/0061310 A1 | 3/2011 | Browne et al. | |
| 2011/0071663 A1* | 3/2011 | Honda | 700/114 |
| 2011/0121419 A1* | 5/2011 | Ueno et al. | 257/421 |
| 2011/0131419 A1* | 6/2011 | Dowds et al. | 713/189 |
| 2011/0187296 A1* | 8/2011 | Matsuki | 318/117 |
| 2011/0232419 A1* | 9/2011 | Karim et al. | 74/99 R |
| 2012/0292155 A1* | 11/2012 | Gunter | 192/82 T |

\* cited by examiner

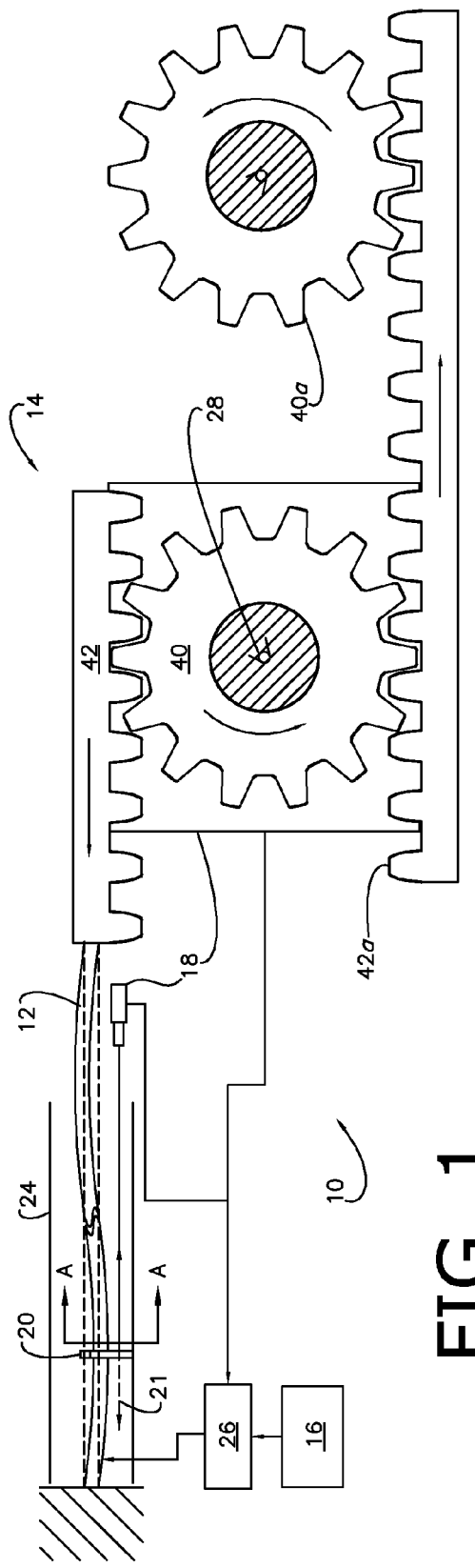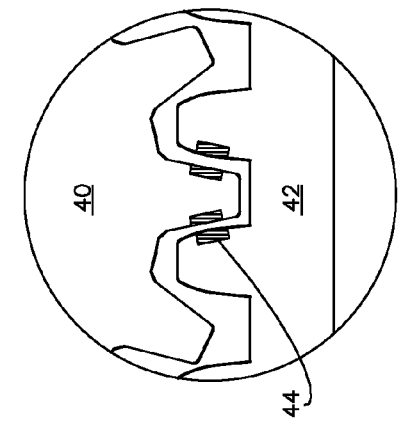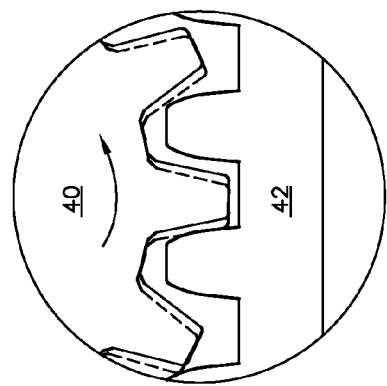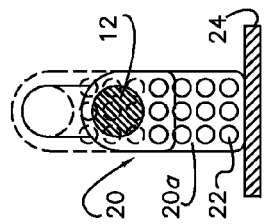

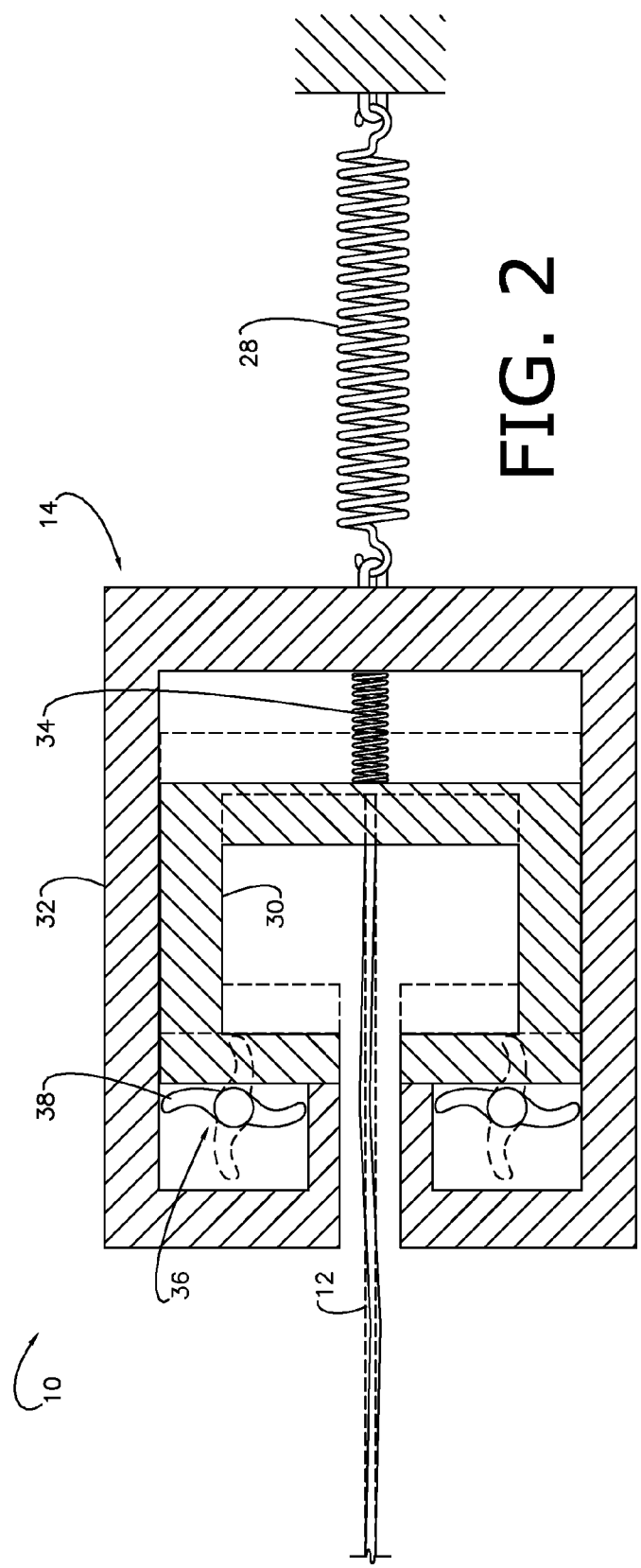

METHOD OF REDUCING THE EFFECT OF PREHEAT TIME VARIATION DURING SHAPE MEMORY ALLOY ACTUATION

BACKGROUND OF THE INVENTION

1. Field of the Invention

The present disclosure generally relates to methods of reducing the effect of preheat period variation in shape memory alloy (SMA) actuators, and more particularly, to a system for and method of doing the same that utilizes the inherent characteristics of backlash and slack within the system.

2. Discussion of Prior Art

Shape memory alloy actuators vary in preheat period, i.e., the time it takes to heat the SMA actuator to just before activation, as a result of many inherent and external factors, including ambient temperature differences, the internal temperature of the actuator (i.e., degree of cooling), constituency differences from actuator to actuator, the cycle life/usage of the actuator, and the change in voltage (where activated on-demand) from circuit to circuit/application to application. Variation in preheat period presents concerns and challenges for systems operations as a whole, and more particularly, to software-based peripherals/algorithms (e.g., overload protection software) that rely upon preheat period as a trigger or for feedback. To compensate, actuators having large preheat period tolerances have been implemented; however, these tolerances present concerns of their own. Among other things, large tolerances reduce precision, and may result in the ineffectiveness of the system. In an overload protection algorithm, for example, imprecision may further result in the failure to timely abate an overload condition.

BRIEF SUMMARY OF THE INVENTION

The present invention presents a method of reducing the effect of preheat period variation during shape memory alloy actuation, which takes advantage of slack, backlash, or compliance typically inherent in most systems. More particularly, the inventive system and method utilize the removal of slack, backlash, or compliance as a more accurate indicator of SMA activation compared to conventional temporal and signal profile based measures, and uses this indicator to better predict or control system performance. As a result, the invention is useful for providing more accurate and effective software based peripherals/algorithms without the addition of hardware, which results in devices that properly function in a broader range of conditions. Thus, the invention is useful for widening the application of software based measures, which reduce the number of moving parts, complexity, and cost of the overall system, in comparison to mechanical counterparts. Finally, the invention is further useful for providing novel means for acquiring secondary information that may be used to enhance performance.

In general, the invention concerns a method adapted for implementation by a system comprising a shape memory alloy actuator and drive-train. The system is configured such that a tolerable degree of slack, backlash, or compliance is presented in the actuator and/or drive-train, respectively, when the system is in the de-actuated state. The method comprises the steps of exposing the actuator to an activation signal, causing the actuator to preheat and then activate, so as to remove at least a portion of the slack, backlash, or compliance, sensing the removal, and determining start of activation of the actuator based thereupon.

In another aspect of the invention, and where activation of the wire triggers a performance, the method includes continually exposing the actuator to an activation signal, monitoring the duration of exposure to the signal by the actuator, sensing the start of removal of the slack, backlash, or compliance, and determining the start of transformation by the actuator as a result of sensing the start of removal, determining secondary information, such as preheat period, delay due to backlash, or the overall time to actuation, based on the duration of exposure, and sensing the completion of removal of the slack and/or backlash. The method further includes the steps of adjusting an algorithm, timer, or threshold operable to produce the performance based on the secondary information. Finally, the performance is improved as a result of adjusting the algorithm, timer, or threshold.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1 is an elevation of a system comprising a shape memory alloy wire actuator and drive-train comprising a plurality of gears and racks in de-actuated states, wherein the actuator presents slack and the drive-train presents backlash (i.e., spacing between teeth) in the de-actuated state, in accordance with a preferred embodiment of the invention;

FIG. 1a is a cross-sectional elevation of the wire actuator and perforated tab taken along A-A in FIG. 1, wherein the wire and tab are in the deactivated and activated (hidden line type) positions, in accordance with a preferred embodiment of the invention;

FIG. 1b is a partial elevation of a drive train comprising a gear and rack defining intermeshed gear and rack teeth, wherein backlash is reflected as the change in angular position of the teeth (compare continuous and hidden line type);

FIG. 1c is a partial elevation of a drive-train comprising first and second gears presenting intermeshed teeth, wherein the teeth include magnetic elements that function to space the teeth, in accordance with a preferred embodiment of the invention; and FIG. 2 is an elevation of a system comprising a shape memory alloy wire actuator and drive-train further including return and slack regenerating mechanisms, in accordance with a preferred embodiment of the invention.

DETAILED DESCRIPTION OF THE INVENTION

The following description of the preferred embodiments is merely exemplary in nature and is in no way intended to limit the invention, its application, or uses.

The present invention concerns a system 10 (FIGS. 1-2) for and method of reducing the effects of preheat period variation in shape memory alloy actuation to effect a more accurate determination of activation; and more particularly, to a system 10 and method that uses the slack, backlash (i.e., the quantity of relative translation amongst driven components necessary to transfer the drive force from the actuator to the output/destination), and/or compliance (i.e., the quantity of elastic deflection, compression, flexure, or otherwise structural give in the drive components themselves during transfer) inherent within the system 10 to accomplish the same. That is to say, the system 10 presents a motion delay in one of the above manners, as is typically the case. As will be further described below, the system 10 employs sensory technology to detect the removal of the slack, backlash, and/or compliance to discern SMA activation, as well as determine secondary information where desired. The invention may be employed wherever SMA actuators are utilized, and over a wide range of applications. In many systems, including an active vent, for example, the present invention may be used to improve the accuracy of a software-based overload protection algorithm, and more particularly, to begin tracking the period of maximum acceptable exposure, when an output is not detected (e.g., the louvers of the vent won't open, etc.), at a time more temporally corresponding to the actual moment of SMA activation.

As used herein, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be pseudo-plastically deformed and upon exposure to some higher temperature will transform to an austenite phase, or parent phase, returning to their shape prior to the deformation.

Shape memory alloys exist in several different temperature-dependent phases. The most commonly utilized of these phases are the so-called Martensite and Austenite phases. In the following discussion, the martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force if it is judged that there is a need to reset the device.

Intrinsic and extrinsic two-way shape memory materials are characterized by a shape transition both upon heating from the martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Returning to the configuration and steps of the present invention, FIG. 1 shows an exemplary system 10 comprising a shape memory alloy wire actuator 12 and drive-train 14; together the actuator 12 and drive-train 14 present a drive. The term "wire", as used herein, is non-limiting, and encompasses other equivalent geometric configurations such as bundles, braids, cables, ropes, chains, strips, etc. Moreover, it is appreciated that the actuator 12 may present other configurations, such as SMA springs, sheet, torque tubes, etc. As previously mentioned, the system 10 functions to detect removal of at least a portion of the slack, backlash, and/or compliance and correlate the detection with the commencement of activation. In a first aspect of the invention, the actuator 12 is configured so as to present slack (i.e., a bowed, sinuous, or curved profile) when deactivated; and removal of the slack is used to determine when the actuator is activated. More particularly, where actuation is desired, the inventive method begins at a first step by heating the SMA wire 12 (e.g., through Joule heating) over a preheat period. That is to say, the wire 12 is continually exposed to an activation signal over an indeterminable preheat period by a suitable signal source 16 (FIG. 1).

Despite the indeterminable heating period, a generally accurate time of activation is detected by physically sensing the removal of the slack at a second step. As such, it is appreciated that an external sensor 18 further composes the system 10. For example, a position sensor 18, such as a photoelectric sensor, may be used to detect a change in position by a reflective surface 20a defined by a tab 20 fixedly attached to the wire 12 (FIGS. 1 and 1a), or by the wire 12 itself. As shown in FIG. 1a, the tab 20 may define a plurality of through-holes 22, and extend orthogonal to the wire 12, where a photoelectric sensor 18 is oriented and positioned to register either an "ON" or "OFF" value, dependent upon alignment of its light source 21 with a through-hole 22. When the wire 12 is caused to undergo transformation and begins to contract, it initially removes the slack, irrespective of system output conditions. This causes the tab 20 to laterally translate, and the sensor 18 to toggle "ON" and "OFF" values as the light source 21 intermittently encounters through-holes 22. The change in values registers a detected change in surface position that is correlated to slack removal. Thus, it is appreciated that the tab 20 is preferably attached to the point (e.g., a vertex of the curved profile) or section of the wire 12 that undergoes the most lateral displacement, so as to maximize the observable slack removal.

More preferably, maximum displacement is ensured and slack may be produced by magnetizing the tab 20 and causing it to laterally engage adjacent ferrous material 24 (FIG. 1a). That is to say, in a preferred embodiment, the tab 20 may further function to produce the slack itself by laterally straining the wire 12 in its Martensitic phase (e.g., via gravity, magnetism, etc.). The wire 12 is configured such that actuation overcomes this effect with minimal hindrance.

Alternatively, disengagement between the tab 20 and adjacent material 24 may be sensed directly. That is to say, the adjacent material 24 may function as a contact that is closed when engaged with the tab 20, and opened when disengaged. Once activation through slack removal is determined, the method proceeds to the next step where the system 10 is configured to trigger or provide feedback to the system 10 in order to perform an action. In the previous example, the system 10 may be further configured to trigger an overload protection routine that terminates the activation signal if a threshold period of exposure is surpassed without achieving the desired output. Thus, the preferred system 10 further includes a controller 26 communicatively coupled to the actuator 12, signal source 16, and sensor 18.

At a final step, the preferred system 10 is configured to autonomously return the output, and regenerate a tolerable degree slack within the actuator 12 for subsequent use. To that end, the tab 20 may be attracted by the adjacent magnetic material 24 when the SMA is in its deactivated state, so as to stretch the wire 12. In another example shown in FIG. 2, an extension spring 28 presenting a spring modulus, $k_1$, is drivenly coupled to a sliding drive-train 14 antagonistic to the actuator 12; the drive-train 14 includes inner and outer telescoping parts 30,32, with the actuator 12 being coupled to the inner part 30 and the spring 28 coupled to the outer part 32 (FIG. 2); and a compression spring 34, having a spring modulus $k_2 < k_1$, intermediately engages the parts 30,32, so as to drive them towards the mated condition shown in FIG. 2. Once the actuator 12 is deactivated and caused to revert back to its Martensite phase, the extension spring 28 works to pseudoplastically strain the wire 12 and return the drive-train 14 to its original position. To autonomously regenerate slack, the drive-train 14 further include at least one, and more preferably a plurality of pawls 36 having protracted arms 38 (FIG. 2). The drive-train 14 is configured such that the pawls 36 are caused to rotate as the parts 30,32 are returned to the original position; and to that end, includes a transmission (not shown) operable to convert the linear motion into rotational displacement. As the arms 38 engage the inner part 30, driving it into the outer part 32 against the action of the compression spring 34, the wire 12 is further strained. Once a half revolution is complete, the parts 30,32 snap back to the mated condition, thereby producing slack in the wire 12. As previously mentioned, a weight or magnetism may be employed to further produce slack within the wire 12.

In a second aspect of the invention, the drive-train 14 may be engineered to provide a tolerable degree of backlash in the system 10, in addition to or lieu of slack in the actuator 12. That is to say, in this configuration, the wire 12 may be strained taut, as is typically desired to effect more rapid response during actuation. Returning to FIGS. 1 and 1b, where the drive-train 14 includes a plurality of gears 40 and racks 42 presenting intermeshed teeth 40a,42a, the teeth 40a, 42a may be spaced to produce a suitable degree of backlash (i.e., play or give before the subsequent component is driven). As in the previous method, a position sensor 18 is secured relative to the drive-train 14, and operable to detect the beginning of the removal of backlash. In the illustrated embodiment, a rotary sensor 18, such as a potentiometer, is positioned relative to the first driven or control gear 40, so as to increase the observable backlash removal—it is appreciated that backlash amongst subsequent components within the drive-train 14 is reflected by increasing displacement in a given gear 40 or rack 42 as it drives the subsequent components. It is further appreciated that increased proximity to the actuator 12 results in faster backlash removal detection, as well as an increased amount of backlash removal to detect.

The preferred system 10 further comprises a controller 26 communicatively coupled to the position sensor 18 (also shown in FIG. 1). The controller 26 is operable to perform an action or performance (e.g., execute an overload protection algorithm), once activation of the SMA wire 12 is detected by sensing the removal of backlash. Detection of SMA activation may be used to predict a target output, and where feedback is provided relating to the output, discern a failure (e.g., blockage of the target output). The preferred method includes returning the drive-train 14 to the de-actuated state, and autonomously regenerating a tolerable degree of backlash in the drive-train 14 for future use. For example, in this configuration, it is appreciated that torsion springs 28, coaxially aligned with each gear 40, may be used to reset the system 10. Equally, extension springs (not shown) may be drivenly coupled to each rack 42, so as to present a biasing force antagonistic to the actuator 12. Alternatively, magnetism may be used; this time, by repelling intermeshed teeth 40a,42a, wherein adjacent teeth surfaces ahead of actuation comprise magnetic elements 44 of like poles, and/or attracting adjacent surfaces arrear actuation comprise elements 44 of opposite poles (FIG. 1c).

As previously mentioned, a third aspect of the invention involves measuring compliance within the drive-train 14, such as compression amongst gear teeth, etc., or flexure/bending in axle rods, racks, lever arms, etc. In addition to material composition, it is appreciated that the geometric shape of drive components play a significant role in the amount of compliance presented; for example, the more elongated a component, the more likely that compliance in the form of flexure will be generated. Here, the sensor 18, such as a linear position sensor, is preferably positioned at or near the actuator 12, so as to be able to detect the aggregate compliance in the system 10. Again, the total compliance offered by the drive-train 14 must be tolerable, so as not to measurably impact the effective stroke of the actuator 12.

Lastly, it is appreciated that removal of slack, backlash, and/or compliance may also be used to provide secondary information, which could then be used to improve system performance. For example, in addition to discerning actual SMA activation, the preheat period, delay attributed to slack/backlash/compliance, and the overall time to actuation (i.e., preheat period plus delay) may also be determined by monitoring the duration of exposure to the signal by the actuator 12 and observing the slack/backlash/compliance removal over time. The preheat period, delay, and/or overall time to actuation may then be used, for example, to adjust an algorithm, timer, or threshold, so as to tune the system 10 for a given set of conditions. That is to say, control software may be programmably configured to adjust a variable to achieve consistent actuation times from the time the actuation signal is received to the time the device is completely actuated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A method of activating a shape memory alloy (SMA) actuator, comprising the steps of:
    a) exposing the SMA actuator to an activation signal wherein the SMA actuator is responsive to the activation signal by a microstructure transformation to activate the SMA actuator;
    b) sensing an observable property of a portion of the SMA actuator or of a component in a drive-train driven by the SMA actuator wherein the observable property is indicative of an amount of motion delay between a beginning of the exposing of the SMA actuator to the activation signal and an onset of the activation of the SMA actuator;
    c) autonomously detecting a change in the observable property based on the sensing;
    d) autonomously determining a reduction in the amount of motion delay based on the detecting of the change in the observable property wherein the reduction in the amount of motion delay is caused by the activation of the SMA actuator; and
    e) autonomously determining the onset of the activation of the SMA actuator based on the determining of the reduction in the amount of motion delay.

2. The method as claimed in claim 1, wherein the motion delay is due to a tolerable degree of slack within the SMA actuator.

3. The method as claimed in claim 2, wherein:
    the SMA actuator comprises:
        a point; and
        a tab defining a surface, the tab being attached to the SMA actuator at the point;
    the method further comprises the step of securely positioning a position sensor relative to the actuator, such that the position sensor is operable to selectively engage the tab and determine a change in position by the point;
    the observable property is a position of the point;
    the position of the point is indicative of the degree of slack; and
    the degree of slack is indicative of the amount of motion delay.

4. The method as claimed in claim 3, wherein the sensor is photoelectric in operation and the tab defines a plurality of through-holes.

5. The method as claimed in claim 3, wherein:
    the position sensor includes a lateral contact operable to physically engage the SMA actuator only when the SMA actuator is deactivated; and
    the method further comprises the step of determining disengagement between the actuator and the contact.

6. The method as claimed in claim 3, wherein the position sensor is positioned at a predetermined location, so as to maximize the observable change in position of the point caused by the activation of the SMA actuator.

7. The method as claimed in claim 1, wherein the motion delay is due to a tolerable degree of compliance within the drive-train.

8. The method as claimed in claim 1, wherein the motion delay is due to a tolerable degree of backlash in the drive-train.

9. The method as claimed in claim 8, wherein:
    the SMA actuator is operatively connected to an active vent system;
    the drive-train further includes at least one gear and rack cooperatively presenting intermeshed teeth; and
    the backlash is presented by a spacing between the intermeshed teeth.

10. The method as claimed in claim 9, wherein the sensing is performed by a potentiometer operable to detect rotation by a driven one of said at least one gear.

11. The method as claimed in claim 1, wherein:
    the method further comprises the step of securing a linear position sensor relative to the drive-train;
    the observable property is a position of the component in the drive-train;
    the position of the component is indicative of the amount of motion delay; and
    the sensing is performed by the linear position sensor.

12. The method as claimed in claim 11, wherein the linear position sensor is positioned at a predetermined location proximate the actuator, so as to maximize a change in the observable property caused by the activation of the SMA actuator.

13. The method as claimed in claim 1, wherein:
the sensing is performed by a sensor;
a controller operable to perform an action is communicatively coupled to the sensor; and
said method further comprises a step of:
f) causing the controller to perform the action in response to the step of determining the onset of the activation of the SMA actuator.

14. The method as claimed in claim 13, wherein:
the controller is operable to perform an overload protection action; and
the step f) further includes the step of terminating the activation signal.

15. The method as claimed in claim 1, wherein after the step of determining the onset of the activation of the SMA actuator, the method further comprises the steps of:
f) returning the SMA actuator, the drive-train, or a combination thereof, to a de-actuated state; and
g) autonomously regenerating the motion delay.

16. The method as claimed in claim 15, wherein step f) further includes the step of engaging the SMA actuator with magnetism, so as to induce strain.

17. The method as claimed in claim 15, wherein the drive-train comprises a plurality of racks or gears cooperatively presenting intermeshing teeth, and step f) further includes the step of engaging the racks or gears with biasing springs operable to regenerate the motion delay after activation of the SMA actuator.

18. A method of activating a shape memory alloy (SMA) actuator, comprising the steps of:
a) continually exposing the SMA actuator to an activation signal operable to cause preheating of the SMA actuator to start a microstructure transformation of the SMA actuator wherein:
a system includes the SMA actuator, a drive-train driven by the SMA actuator, or a combination thereof; and
the system has a movable output responsive to an activation of the SMA actuator;
b) monitoring a duration of the exposure to the activation signal by the actuator, and observing over time an observable property of a portion of the SMA actuator or of a component in a drive-train driven by the SMA actuator wherein:
the observable property is indicative of an amount of motion delay between a beginning of the exposing of the SMA actuator to the activation signal and the output motion of the system; and
the amount of motion delay includes a preheat delay between the beginning of the exposing of the SMA actuator to an onset of the activation of the SMA actuator;
c) autonomously detecting a reduction over time of the amount of the motion delay based on the observing of the observable property by a sensor, wherein the reduction in the amount of motion delay is caused by the activation of the SMA actuator, and determining the onset of activation of the SMA by the actuator;
d) determining a secondary information, based on the monitoring, the observing and the autonomous detecting;
e) adjusting an algorithm, a timer, or a threshold based on the secondary information; and
f) improving a performance of the system based on the adjusting the algorithm, timer, or threshold.

19. The method as claimed in claim 18, wherein the secondary information is the preheat delay of the SMA actuator.

20. The method as claimed in claim 18, wherein the secondary information is an overall actuation time of the system.

* * * * *